(12) United States Patent
Broom (10) Patent No.: US 6,367,409 B1
(45) Date of Patent: Apr. 9, 2002

(54) FOOD COATING APPARATUS

(75) Inventor: Gregory A. Broom, Richardson, TX (US)

(73) Assignee: GDSK International, Inc., Richardson, TX (US)

( * ) Notice: Subject to any disclaimer, the term of this patent is extended or adjusted under 35 U.S.C. 154(b) by 0 days.

(21) Appl. No.: 09/366,365

(22) Filed: Aug. 3, 1999

Related U.S. Application Data (60) Provisional application No. 60/095,281, filed on Aug. 4, 1998.

(51) Int. Cl.[7] ............ A23G 3/20; A23G 3/26; B65D 1/24; B65D 1/36
(52) U.S. Cl. ............ 118/13; 118/19; 220/501; 366/130
(58) Field of Search ............ 118/13, 19; 366/130; 219/620; D7/412, 354; 220/501

(56) References Cited

U.S. PATENT DOCUMENTS

| | | | |
|---|---|---|---|
| 1,569,264 A | | 1/1926 | Clark |
| 2,616,391 A | | 11/1952 | Russell |
| 3,698,783 A | * | 10/1972 | Swett et al. ........... 312/351 |
| 4,291,616 A | * | 9/1981 | Taylor ........... 99/446 |
| 4,677,906 A | * | 7/1987 | Lowe ........... 99/450 |
| 5,189,947 A | * | 3/1993 | Yim ........... 99/415 |
| 5,358,330 A | | 10/1994 | Moll ........... 366/130 |
| 5,575,848 A | | 11/1996 | Chedrille ........... 118/13 |
| 5,899,353 A | * | 5/1999 | Sabin et al. ........... 220/507 |
| 6,170,696 B1 | * | 1/2001 | Tucker et al. ........... 220/793 |

OTHER PUBLICATIONS

Cajun Flip–N–Fry, Website, Date Unknown.

* cited by examiner

*Primary Examiner*—Richard Crispino
*Assistant Examiner*—Kevin P Shortsle
(74) *Attorney, Agent, or Firm*—Jenkens & Gilchrist (57) ABSTRACT

A food coating apparatus has a container, cover, and dividing sieve. The container has a bottom, lower side wall extending from the bottom, a screen land extending from the lower side wall, and an upper side wall extending from the screen land. The upper side wall further includes a seal edge. The cover has a body and a seal disposed around the body. The seal of the cover is adapted for engaging the seal edge of the lower container. The dividing sieve has a screen section, sealing land disposed outwardly from the screen section, and a plurality of legs with feet extending therefrom. The dividing sieve is adapted for residing between the cover and the screen land when the seal of the cover engages the seal edge of the container.

1 Claim, 9 Drawing Sheets

FOOD COATING APPARATUS

RELATED APPLICATIONS

This application is a continuation of provisional application No. 60/095,281, filed on Aug. 4, 1998, now pending, which is hereby incorporated herein in its entirety by specific reference thereto.

BACKGROUND

The present invention generally relates to the coating of food items, in particular, an apparatus for coating food items with a second material.

SUMMARY

The present invention generally comprises a container, a cover, and a dividing sieve. The container has a bottom, a lower side wall section extending from the bottom, a screen land extending from the lower side wall, and an upper side wall extending from the screen land. The upper side wall of the container also includes a seal edge. The cover has a main body and a seal disposed around the main body. The seal of the cover is adapted for engaging the seal edge of the container. The dividing sieve has a first side and a second side, and includes a screen section, a sealing land disposed outwardly from the screen section, a plurality of legs extending from first side of the dividing sieve, each leg having a foot associated therewith. The sealing land includes a land interface surface, and the distance between the plurality of feet and the land interface surface of the dividing sieve is equal to about the distance between the cover and the screen land when the seal of the cover engages the seal edge of the container.

DETAILED DESCRIPTION

Referring now to the drawings, and more particular to FIGS. 1–14, there is shown coating apparatus 10 comprising a lower container 100, an upper cover 200, and a dividing sieve 300. The coating apparatus 10 has a storage assembly configuration 10a (as shown in FIGS. 1–7), and a coating assembly configuration 10b (as shown in FIGS. 8–14).

The lower container 100 generally includes a bottom 110 with side walls 120 extending upwardly therefrom. In a preferred embodiment, the lower container 100 is an elongated container. Bottom rests 111, 112, 113, and 114, extend downwardly from the bottom 110 to prevent the bottom 110 from adhering to a counter or other flat surfaces. The side walls 120 have a lower side wall section 121 connected to an upper side wall section 125 by a screen land 122. In a preferred embodiment, the screen land 122 includes screen land ends 123 which create exterior grasping lands 124 at the opposing ends of the lower container 100. The upper side wall section 125 includes an upper seal edge 126.

Figure 13:
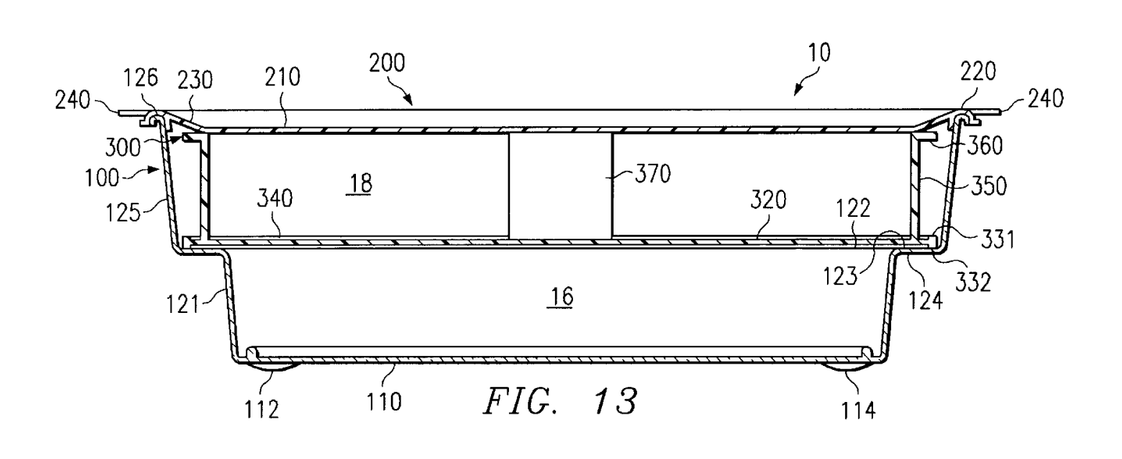
FIG. 13 is a cross sectional side elevational view of the food coating apparatus in FIG. 8.
Figure 14:
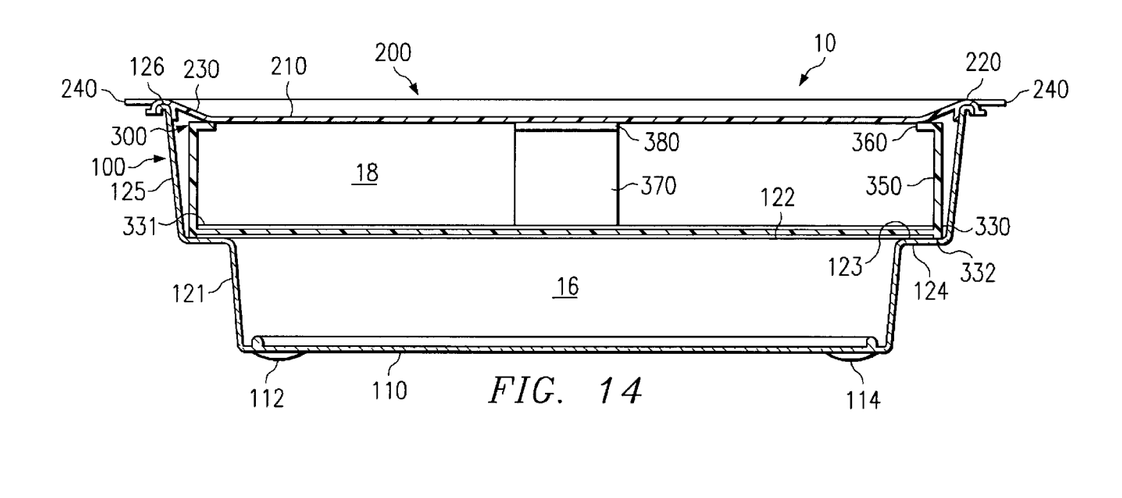
FIG. 14 is a cross sectional side elevational view of another embodiment of the food coating apparatus in FIG. 8.

The upper cover 200 generally includes a planner body 210 connected to a seal 220 by a recess 230, and handles 240 extending from the upper cover 200. The upper cover 200 is designed such that the seal 220 disposed around the perimeter of the planner body 210 will engage the upper seal edge 126 of the sidewalls 120 of the lower container 100. The handles 240, as shown in FIGS. 13 and 14, are preferably mounted to the upper cover 200 extending outwardly near the outer edges of the long dimension of the upper cover 200.

Figure 1:
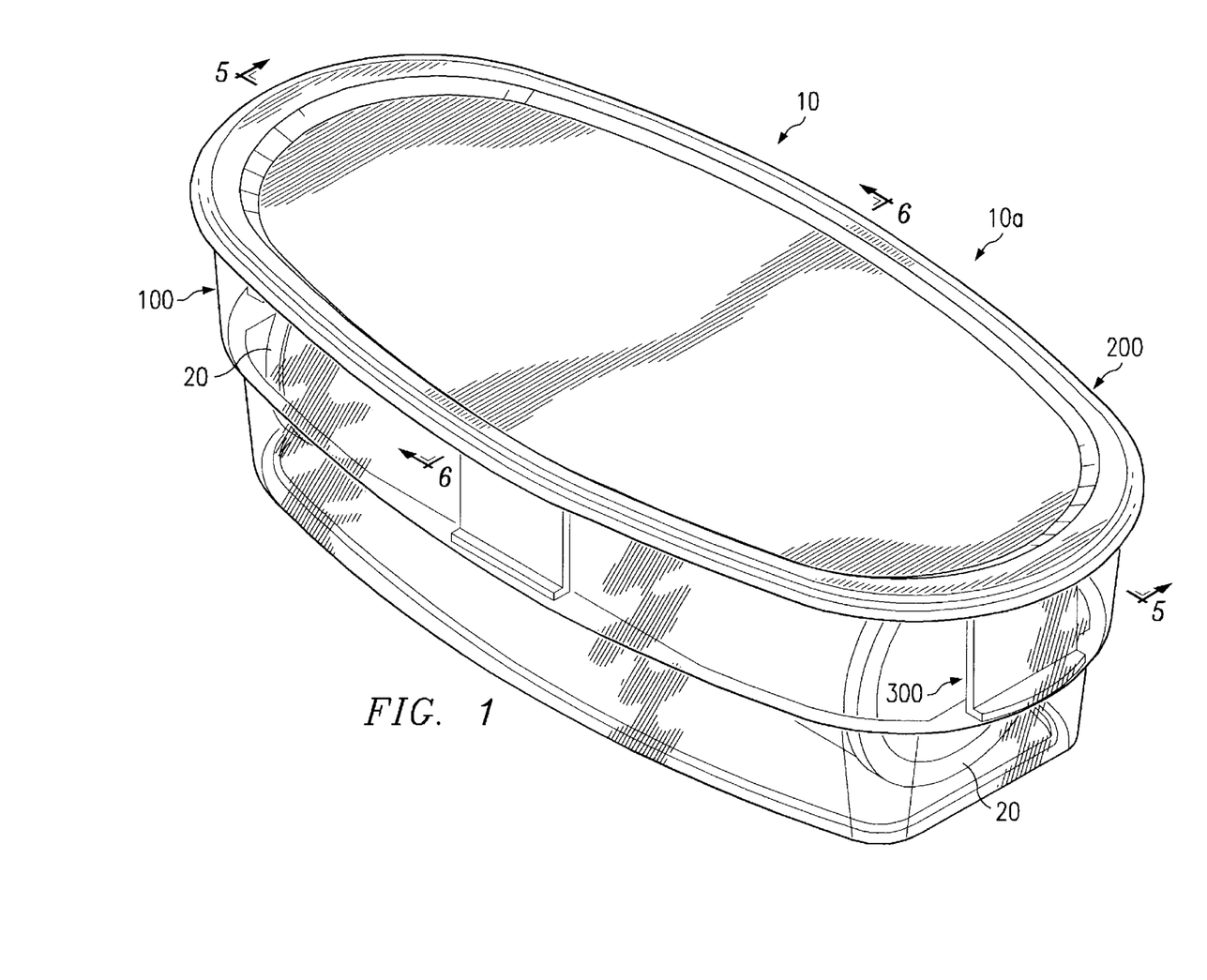
FIG. 1 is a perspective view of an embodiment of the present invention illustrated as a food coating apparatus, with a transparent lower container, the food coating device being in a storage configuration.
Figure 2:
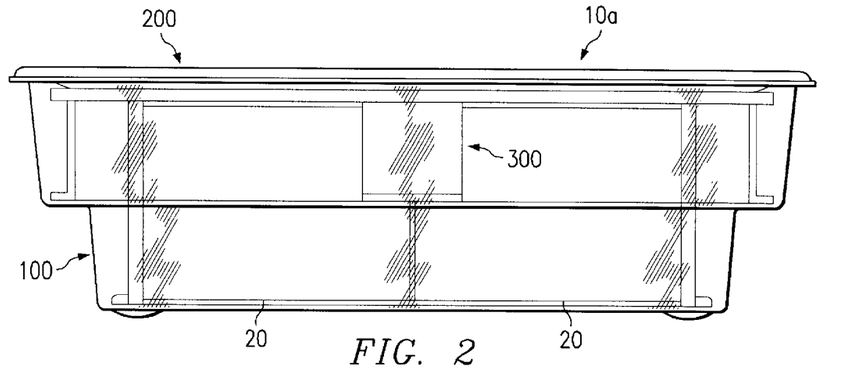
FIG. 2 is an elevational, side view of the food coating apparatus in FIG. 1.
Figure 3:
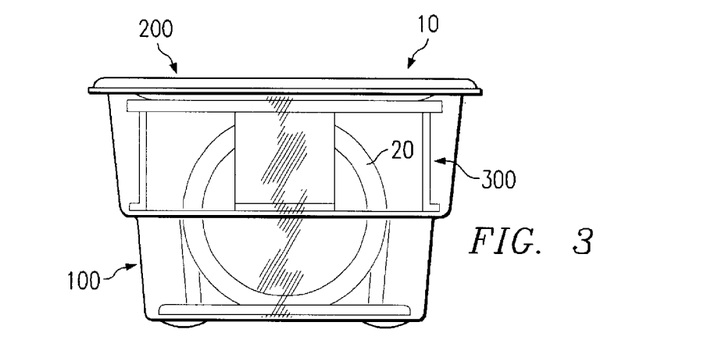
FIG. 3 is an elevational, end view of the food coating apparatus in FIG. 1.
Figure 4:
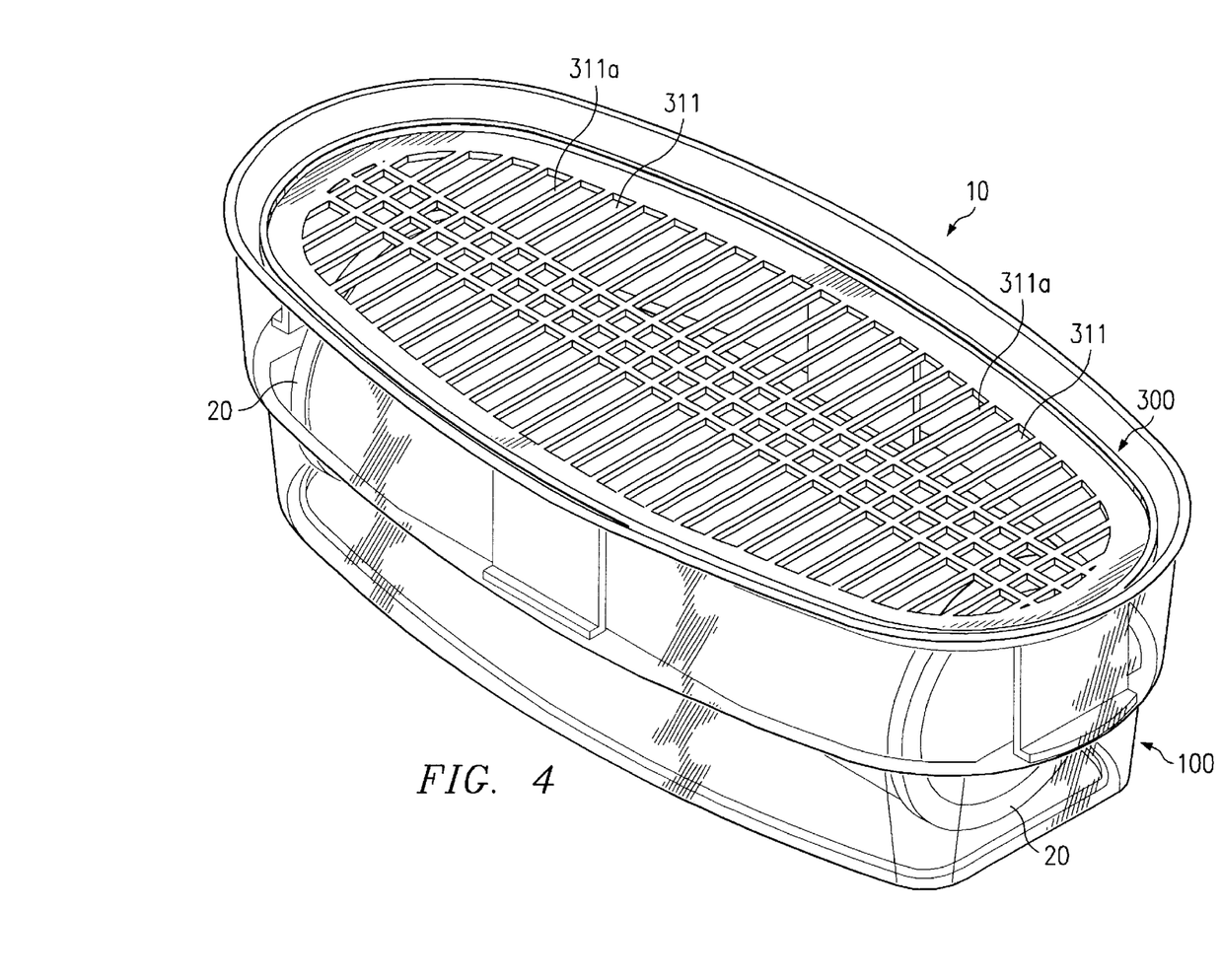
FIG. 4 is a perspective view of the food coating apparatus in FIG. 1, with the upper cover removed.
Figure 5:
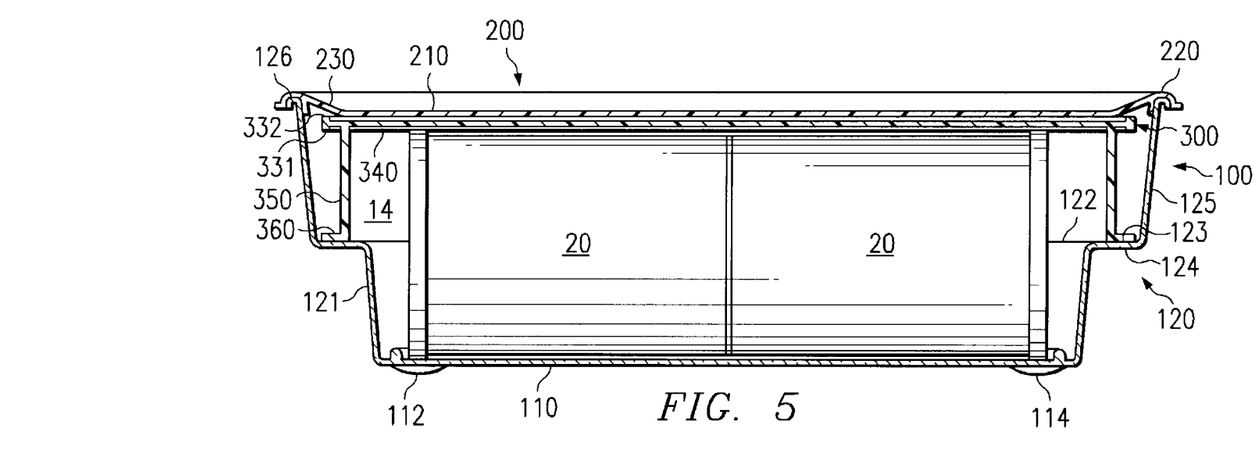
FIG. 5 is a side elevational, cross sectional view of the food coating apparatus in FIG. 1.
Figure 6:
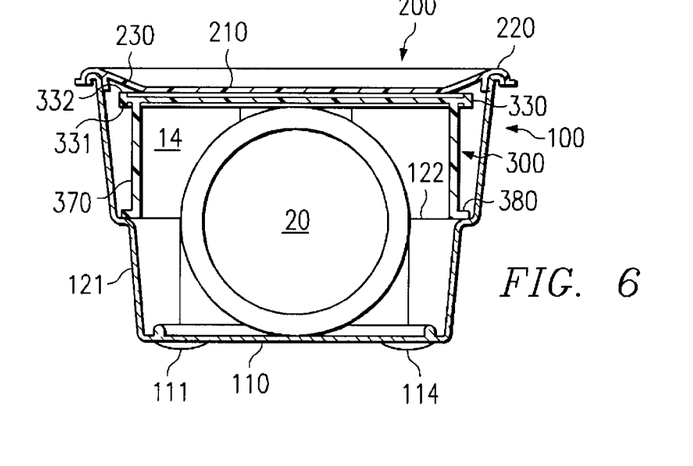
FIG. 6 is an cross-sectional end view of the food coating apparatus in FIG. 1.
Figure 7:
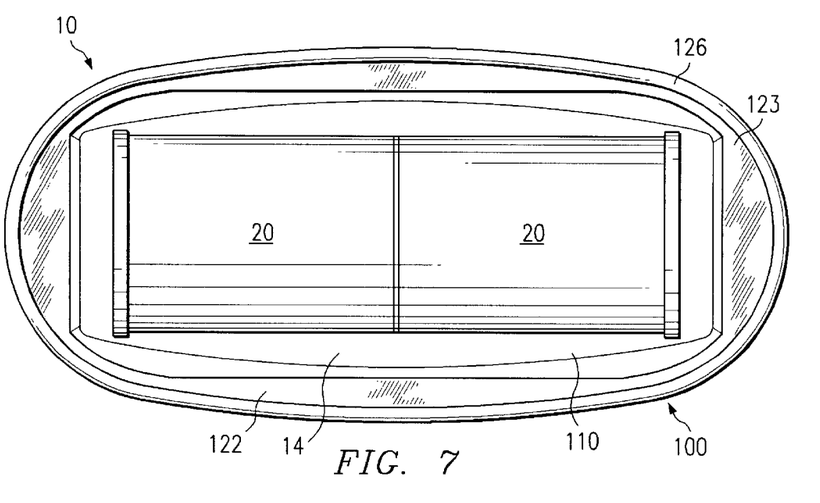
FIG. 7 is a top plan view of the food coating apparatus in FIG. 1, with the upper cover and dividing sieve removed.
Figure 8:
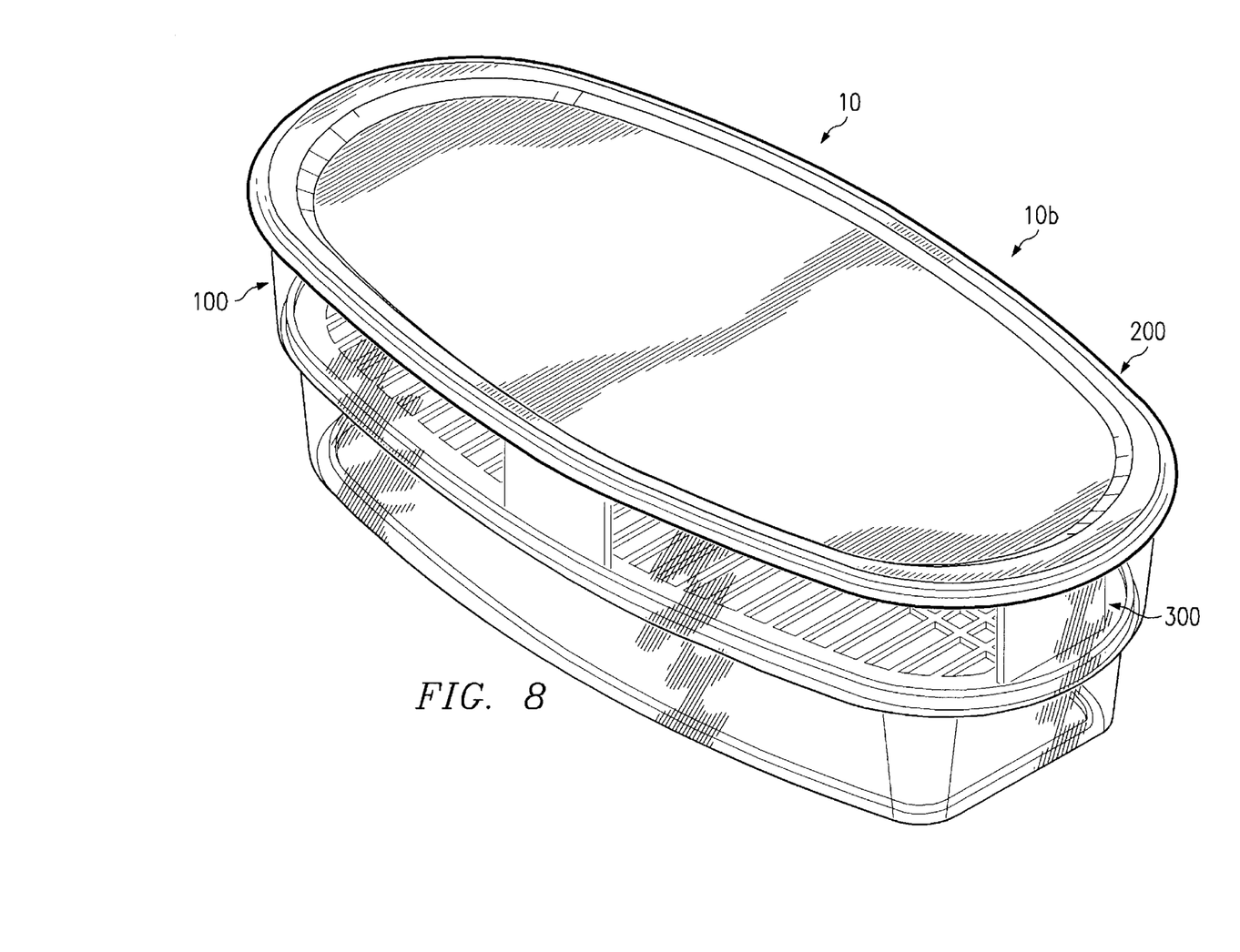
FIG. 8 is a perspective view of the food coating apparatus from FIG. 1, with the containers removed and arranged in a coating configuration.
Figure 9:
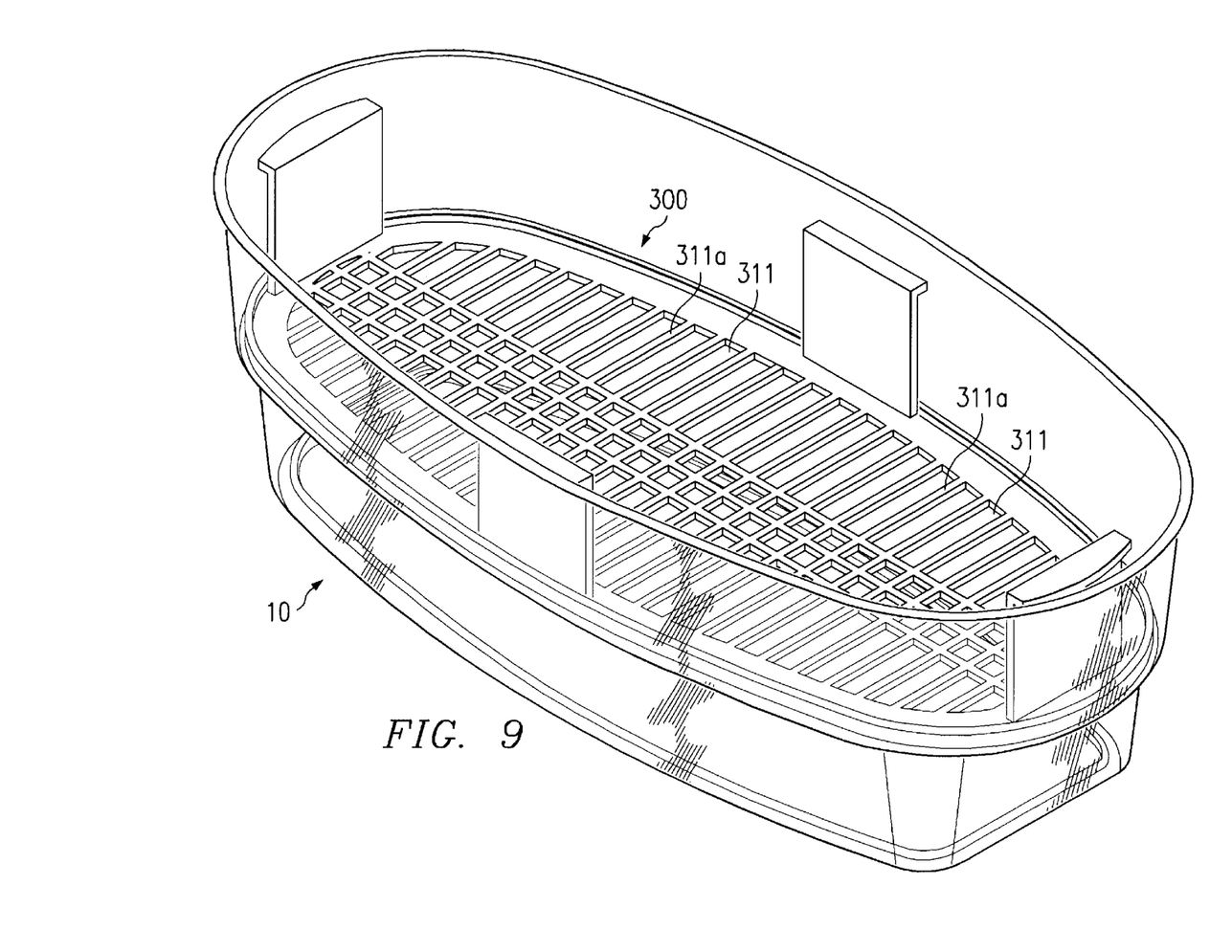
FIG. 9 is a perspective view of the food coating apparatus in FIG. 8, with the upper cover removed.
Figure 10:
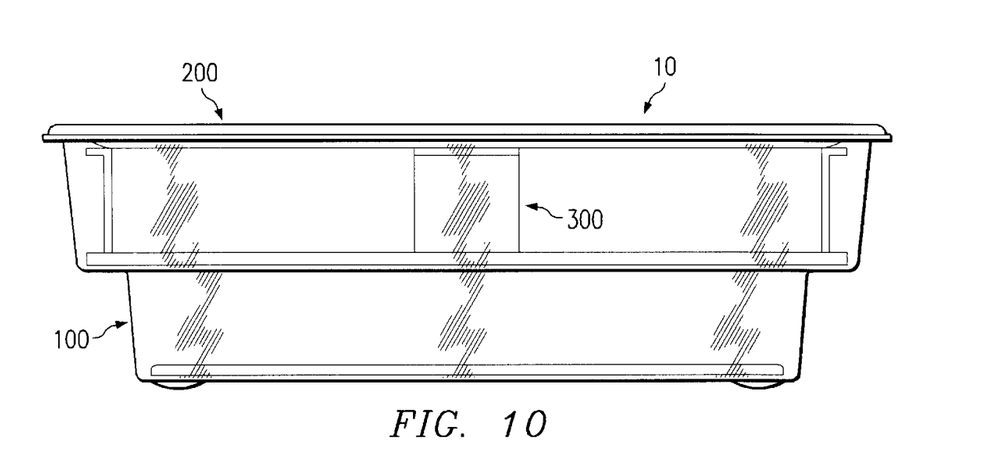
FIG. 10 is a side elevational view of the coating apparatus from FIG. 8.
Figure 11:
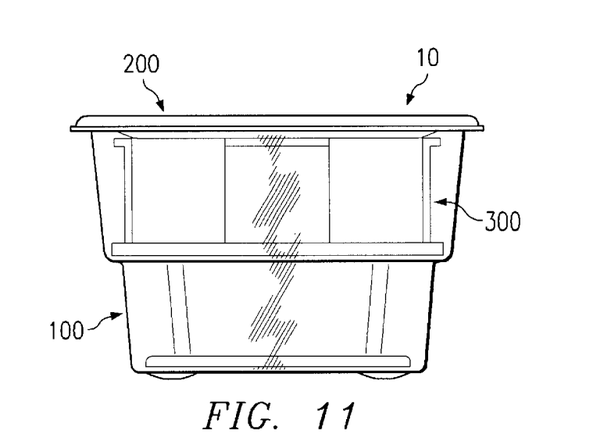
FIG. 11 is a end elevational view of the coating apparatus from FIG. 8.
Figure 12:
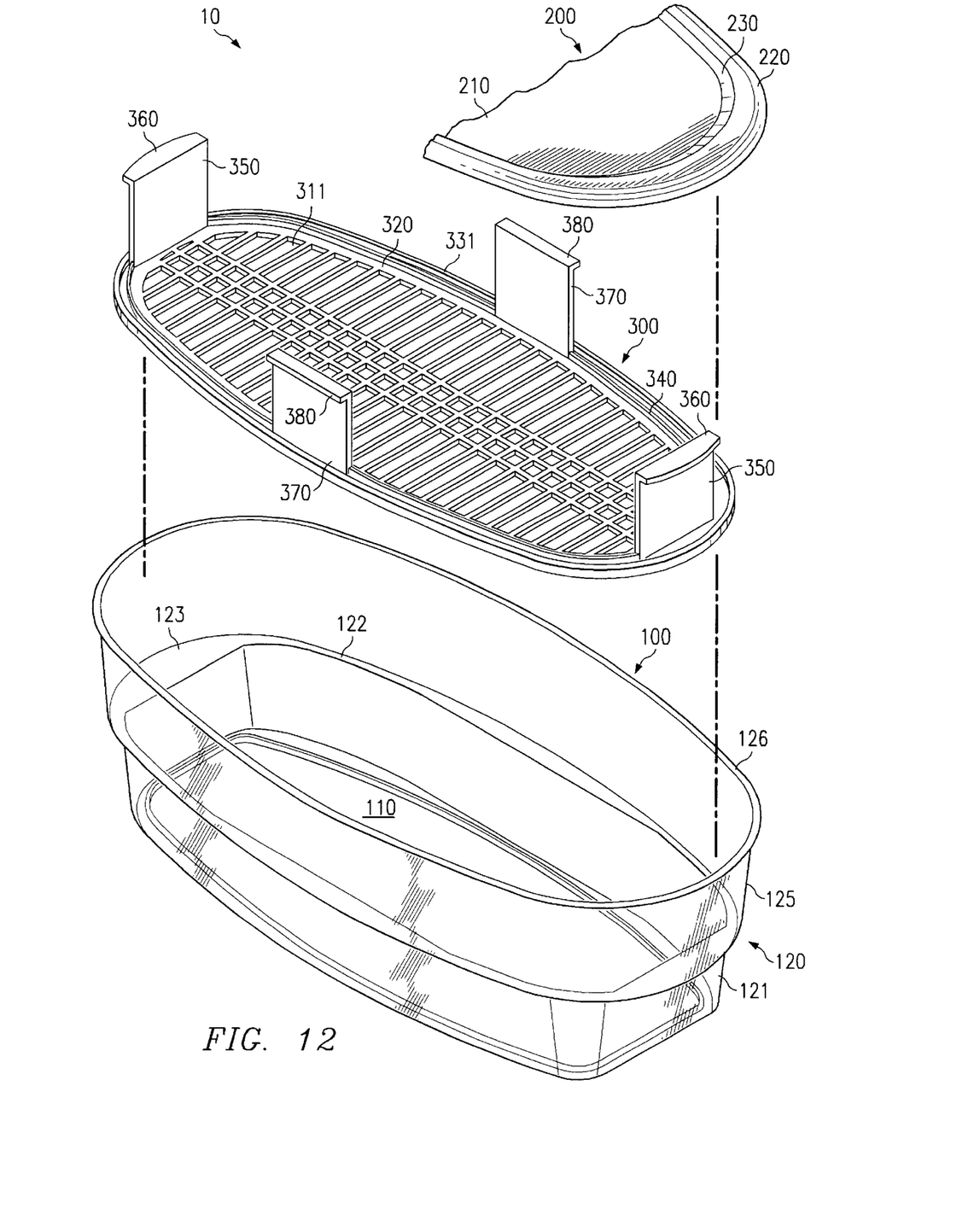
FIG. 12 is an exploded perspective of the food coating apparatus from FIG. 8, with the upper cover in a partial view.

The dividing sieve 300 generally includes a screen section 310, a sealing land 320 disposed around the screen section 310, end legs 350 and side legs 370 extending upwardly from the first side of the dividing sieve 300, end feet 360 disposed on the end of the end legs 350, and side feet 380 disposed on the end of the side legs 370. A first sealing ridge 331 is disposed on a first side of the dividing sieve 300 around the perimeter of the sealing of land 320, and a second sealing ridge 332 is disposed on a second side of the dividing sieve 300 around the perimeter of the sealing of land 320. In one embodiment, as shown in FIGS. 12 and 13, a retaining wall 340 extends upwardly from the first side of the dividing sieve 300 around the outer perimeter of the screen section 310.

The screen section 310 includes apertures 311 for permitting the passing of a coating material from the first side of the dividing sieve 300 to the second side of the dividing sieve 300. The size and spacing of the apertures 311 are selected to allow the coating material to pass through the apertures 311 but prevent the food item to be coated from passing through the apertures 311. The size and spacing of the apertures 311 are also selected to provide an optimum coating of coating material on the food item. In a preferred embodiment, the apertures 311 are the spaces between a grid 311a (See FIGS. 4–9) that allows a wet or dry coating material to pass through the dividing sieve 300 for coating the food item. The screen section 310 and sealing land 320 are sized such that the sealing land 320 extends over the screen land 122 in the side walls 120 of the lower container 100. The retaining wall 340 is disposed around the perimeter of the screen section 310 of the dividing sieve 300.

The end legs 350, end feet 360, side legs 370, and side legs 380, are also located on the dividing sieve 300 such that the end feet 360 and side feet 380 position over the screen land 122 in the side walls 120 of the lower container 100. The end legs 350, end feet 360, side legs 370, side feet 380 of the dividing sieve 300, and the distance between the screen land 122 and upper seal edge 126 of the side walls 120, are sized such that the screen section 310 of the dividing sieve 300 is adjacent to the planner body 210 of the upper cover 200 when the coating apparatus 10 is in the storage configuration 10a.

In one embodiment, as shown in FIGS. 1–13, the feet 360/380 are disposed on the legs 350/370 extending in a direction away from the screen section 310 of the dividing sieve 300. In another embodiment, shown in FIG. 14, the feet 360/380 are disposed on the legs 350/370 in a direction towards the screen section 310 of the dividing sieve 300. In yet another embodiment, the feet 350/370 are extensions to the legs 360/380.

In the storage configuration 10a of the coating apparatus 10, as shown in FIGS. 1–7, the dividing sieve 300 is positioned within the lower container 100 with the end feet 360 and side feet 380 adjacent to the screen land 122 of the lower container, the seal 220 of the upper cover 200 engaging the upper seal edge 126 of the lower container 100, and the screen section 310 of the dividing sieve 300 positioned adjacent to the planner body 210 of the upper cover 200. Preferably, the planner body 210 of the upper cover 200 engages the dividing sieve 300 due to a resilient force created by the recess 230 in the upper cover 200, thereby forcing the dividing sieve 300 into an engagement with the screen land 122 of the lower container 100. In the storage configuration 10a of the coating apparatus 10, a storage compartment 14 exists between the dividing sieve 300 and the bottom 110 of the lower container 100. The lower container 100, upper cover 200, and dividing sieve 300 are preferably configured in an elongated configuration to provide storage in the storage compartment 14 for one or more containers 20 of material, such as material for coating the food item. Also, the lower side wall section 121 of the lower container 100 is preferably sized to retain the containers 20 in a relatively stationary position within the coating apparatus 10 in the storage configuration 10a.

In the coating configuration 10b of the coating apparatus 10, as shown in FIGS. 8–14, the sealing ridge 330 of the dividing sieve 300 is positioned within the lower container 100 with the sealing ridge 330 adjacent to the screen land 122 of the lower container 100, the seal 220 of the upper cover 200 engaging the upper seal edge 126 of the lower container 100, and the end feet 360 and the side feet 380 of the dividing sieve 300 adjacent to the planner body 210 of the upper cover 200. In an embodiment in which the dividing sieve 300 does not have a sealing ridge 330, the sealing land 320 of the dividing sieve 300 is positioned adjacent to the screen land 122 of the lower container 100. Preferably, the planner body 210 of the upper cover 200 engages the end feet 360 and the side feet 380 of the dividing sieve 300 due to a resilient force created by the recess 230 of the upper cover 200, thereby forcing the sealing ridge 330 (or sealing land 320) into an engagement the screen land 120 of the lower container 100. In the coating configuration 10b of the coating apparatus 10, a coating material compartment 16 exists between the screen section 310 of the dividing sieve 300 and the bottom 110 of the lower container 100, and a coating compartment 18 exists between the screen section 310 of the dividing sieve 300 and the planner body 210 of the upper cover 200.

In use, a user will remove the upper cover 200 and the dividing sieve 300 from the lower container 100 of the coating apparatus 10 in a storage configuration 10a to gain access to the containers 20 of coating material within the storage compartment 14. After disposing the coating material within the coating material compartment 16, the user will invert the dividing sieve 300 and rest the sealing ridge 330 (or sealing land 320) of the dividing sieve 300 on the screen land 122 of the lower container 100. After the dividing sieve 300 is positioned in the lower container 100 for the coating configuration 10b, the food item to be coated is placed upon the screen section 310 of the dividing sieve 300 and the seal 220 of the upper cover 200 is engaged with upper seal edge 126 of the lower container 100.

Once the coating apparatus 10 is in the coating configuration 10b with the coating material in the coating material compartment 16 and the material to be coated in the coating compartment 18, the user grasps the coating apparatus between the exterior grasping land 124 of the lower container 100 and the upper cover 200 for inverting and slaking the coating apparatus 10 to cause the coating material to pass from the coating material compartment 16 into the coating compartment 18 and engaging the food item.

After the food item has been sufficiently coated, the coating apparatus 10 is oriented in an upright position and slightly shaken to allow excess coating material 30 to pass from the coating compartment 18 into the coating material compartment 16. At this point, the upper cover 200 may be removed and the food item be removed by grasping the end feet 360 or side feet 380 and lifting the dividing sieve 300 out of the lower container 100.

What is claimed is:

1. A food coating apparatus comprising:
    a container having a bottom, lower side wall section extending from the bottom, a screen land extending from the lower side wall, and an upper side wall extending from the screen land, the upper side wall further having a seal edge disposed away from the screen land;
    a cover having a main body and a seal disposed around the main body, the seal adapted for engaging the seal edge of the container;
    a dividing sieve having a first side and a second side, said dividing sieve including a screen section with apertures therein, a sealing land disposed outwardly from the screen section and having a land interface surface, a plurality of legs extending from the first side of the dividing sieve, and a plurality of feet, each one of the feet associated with one of the legs and extending therefrom;
    a sealing ridge disposed on the sealing land on the second side of the dividing sieve; and
    wherein the distance between the plurality of feet and the land interface surface of the sealing land is about equal to the distance between the cover and the screen land when the seal of the cover engages the seal edge of the container.

* * * * *